United States Patent
Schjerven, Sr. et al.

[11] Patent Number: 6,157,002
[45] Date of Patent: Dec. 5, 2000

[54] SMALL CONVEYOR TOASTER/OVEN

[75] Inventors: William S. Schjerven, Sr., Schaumburg; Roberto Nevarez, Kirkland; Adrian A. Bruno, Rolling Meadows, all of Ill.

[73] Assignee: Middleby Cooking Systems Group, Elgin, Ill.

[21] Appl. No.: 09/019,678

[22] Filed: Feb. 6, 1998

[51] Int. Cl.[7] .............................. A21B 2/00; A21B 1/40; A21B 1/42; F27B 9/06

[52] U.S. Cl. ........................................ 219/388; 219/494

[58] Field of Search ................................... 219/388, 400, 219/489–506, 700; 392/417; 99/326, 386, 443 C; 198/857, 853; 126/21 A, 21 R; 374/208, 209; 432/233, 238

[56] References Cited

U.S. PATENT DOCUMENTS

| | | | |
|---|---|---|---|
| D. 275,725 | 10/1984 | Henke et al. | D7/348 |
| 3,608,702 | 9/1971 | Fraioli, Sr. | 198/847 |
| 4,080,842 | 3/1978 | Lapeyre et al. | 198/853 |
| 4,185,546 | 1/1980 | Karpisek | 99/386 |
| 4,188,868 | 2/1980 | Baker et al. | 99/386 |
| 4,410,083 | 10/1983 | Poerink | 198/853 |
| 4,554,437 | 11/1985 | Wagner et al. | 219/411 |
| 4,615,014 | 9/1986 | Gigandet et al. | 364/557 |
| 4,655,126 | 4/1987 | Wells | 99/386 |
| 4,664,923 | 5/1987 | Wagner et al. | 426/233 |
| 4,824,644 | 4/1989 | Cox et al. | 422/300 |
| 4,951,648 | 8/1990 | Shukla et al. | 126/21 A |
| 5,025,775 | 6/1991 | Crisp | 126/21 A |
| 5,131,841 | 7/1992 | Smith et al. | 432/59 |
| 5,176,249 | 1/1993 | Esterson et al. | 198/853 |
| 5,197,375 | 3/1993 | Rosenbrock et al. | 99/328 |
| 5,206,045 | 4/1993 | Stuck | 426/243 |
| 5,223,290 | 6/1993 | Alden | 99/386 |
| 5,253,564 | 10/1993 | Rosenbrock et al. | 99/326 |
| 5,277,105 | 1/1994 | Bruno et al. | 99/443 C |
| 5,382,093 | 1/1995 | Dutcher | 374/208 |
| 5,579,898 | 12/1996 | Nakagawa et al. | 198/851 |
| 5,584,233 | 12/1996 | Glucksman et al. | 99/348 |
| 5,588,354 | 12/1996 | Stuck et al. | 99/386 |
| 5,686,004 | 11/1997 | Schneider | 219/388 |
| 5,801,362 | 9/1998 | Pearlman et al. | 219/400 |
| 5,961,866 | 10/1999 | Hansen | 219/434 |

*Primary Examiner*—Joseph Pelham
*Attorney, Agent, or Firm*—Laff, Whitesel & Saret, Ltd.; J. Warren Whitesel

[57] ABSTRACT

A plurality of small, low cost conveyor toaster/ovens can be stacked with substantially no physical spacing required between the units. In part the stackability results from a blower/fan that drives cooling air through a common plenum surrounding the conveyor. The cooling air is sucked into one side of the unit and then divided between the lower motor compartment and the upper air plenum flowing over the top and bottom of the oven. The air is then recombined to cool the rear compartment and exits the unit via several vents in the back and opposite side of the oven. A control panel enables the user to pre-select different menu schedules which can be modified, as required. Each selection is identified by a single digit on a key pad in the control panel. The actual temperature within the toaster/oven is sensed by a thermocouple in contact with the heater element sheath. The control converts the stored data via a mathematical function and in response to temperatures sensed on the heater. In order to provide both toasting and hearth baking the conveyor may be equipped with either of two types of endless belts, one being a tightly woven herringbone belting material that hearth bakes the food product. The other type of endless belt is made of an open wire link belting material.

19 Claims, 9 Drawing Sheets

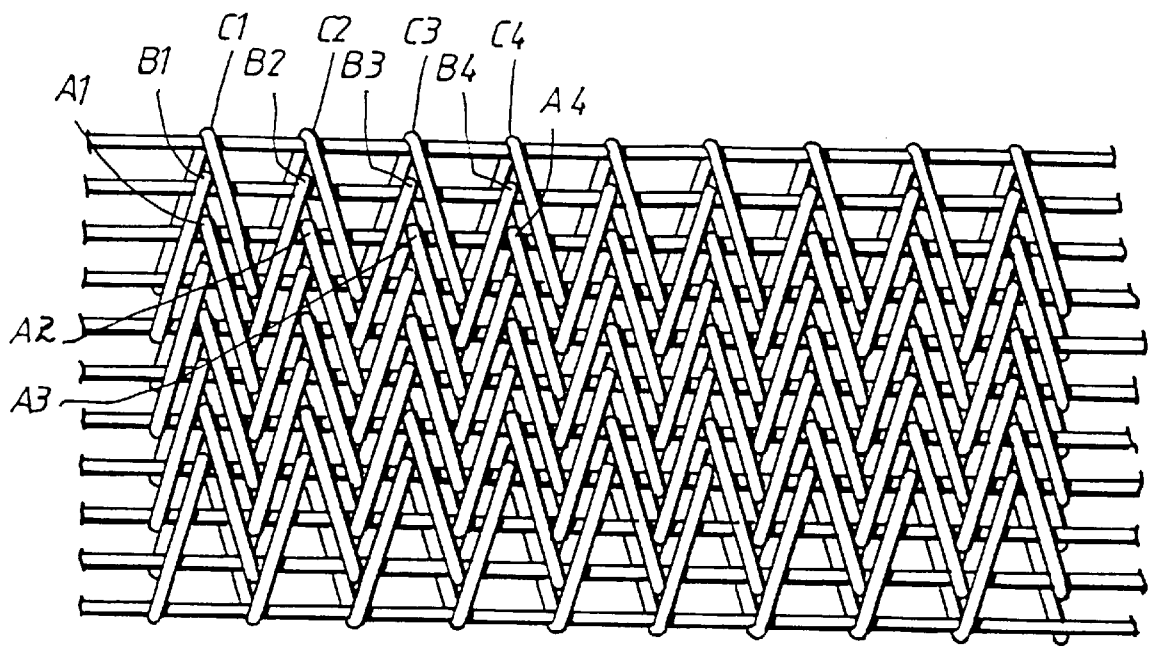
FIG_11.
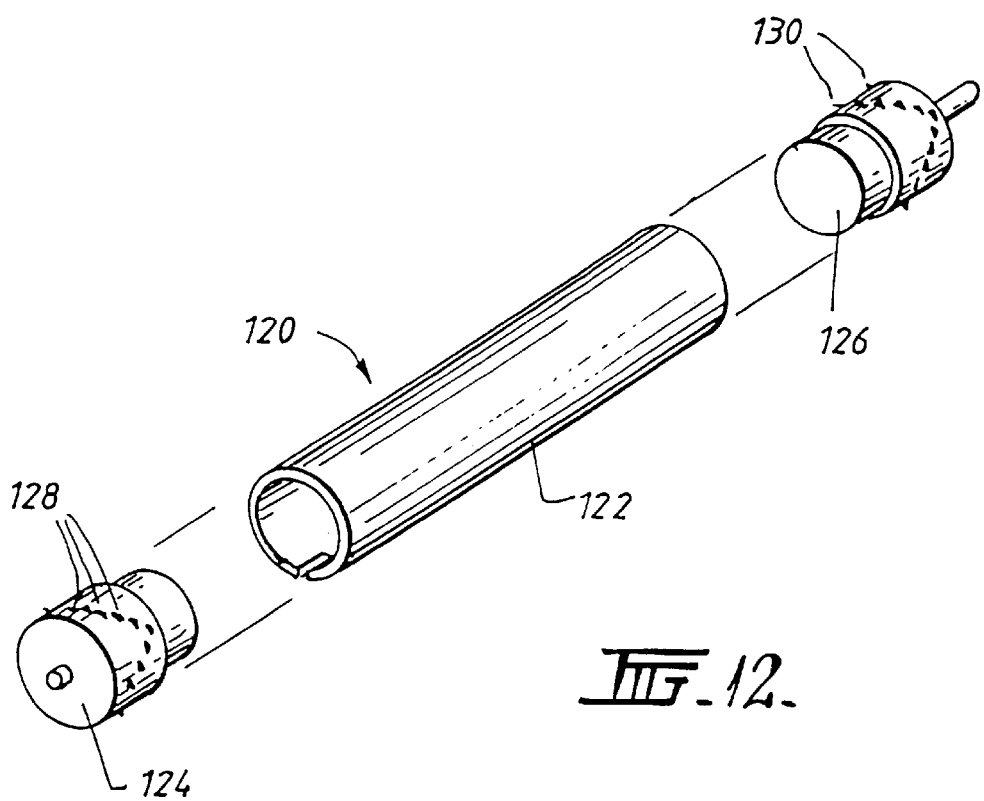
FIG_12.

SMALL CONVEYOR TOASTER/OVEN

This invention relates to small toaster/ovens having a design with multi-purpose capabilities and more particularly to commercial toaster/ovens having conveyors which carry food products at a controlled rate of speed and with a controlled temperature which leads to as nearly perfect and uniform cooking as reasonably possible.

BACKGROUND

A few prior ovens are shown in U.S. Pat. Nos. 3,665,842; 3,809,859; 4,008,996; 4,044,660; 4,134,005; 4,226,176; 4,245,613; 4,386,558; 4,366,177; 4,664,923; 4,465,701; 5,197,375; 5,253,564 and 5,473,975, and Canadian Patent 1,041,148.

There are many large and sophisticated conveyor ovens weighing hundreds, and sometimes a thousand or more, of pounds with expensive controls. However, such sophistication has not extended to the small toaster/oven size, which has a relatively low cost as compared to the cost of the large oven. For commercial installations the toaster/oven size has a length in the nature of two or three feet and a width of, perhaps, a foot and a half.

A desirable toaster/oven has a flexible design wherein a manufacturer provides a plurality of appliances which meet a variety of customer requirements without requiring any appreciable redesign or change of tooling or production procedures. Examples of the various customer requirements are: toasting high or tall products (such as muffins), medium height products (such as bagels), and low height products (such as bread slices), and baking a great variety of products.

The term "Hearth Baking" is often applied to a type of baking where a heat sink (such as a flat stone) is first heated in an oven to a fairly high temperature and then a food product (such as a pizza) is placed on the heat sink. There is a fast cooking or baking action at the area of contact between heat sink and food product followed by complete cooking in the oven.

Another need is to provide a small conveyor toaster/oven, of a single general size and design, but with a capability by which the manufacturer may select between toasting and hearth baking without requiring a substantial amount of redesign, tooling, or the like. It would also be desirable to provide a toaster/oven with a single and flexible design which can be made larger or smaller, to use an open wire link conveyor belt or a tightly woven herringbone belt, and to toast or hearth bake.

Also, on an occasion, perhaps a full load of food products filling the entire conveyor passes through the oven to soak up a substantial amount of heat during the toasting, cooking, or hearth baking process. On another occasion, perhaps a half load or only a few food products pass through the oven to soak up a small amount of heat during the process. Hence, there should be some way of adjusting both the amount and the nature of heat that is produced along with the speed at which food is conveyed through the oven.

U.S. Pat. No. 5,473,975 shows and describes an open link wire conveyor belt made of relatively widely spaced parallel wires. The heat passes through the open spaces between the wires which have only a minimum, if any effect, upon the food product.

There is another kind of food product, such as a grilled cheese sandwich, for example, which is best if prepared or hearth baked on a griddle, such as a tightly woven herringbone hearth belt. If these and similar food products are cooked on a conventional griddle, someone has to more or less continuously observe them and remove them when done. This personal attention is not very efficient, especially for fast food restaurants, and often leads to variations in the final food product. It would be far better if the raw food product can be placed on one end of a conveyor and a fully and uniformly prepared product can be removed from the other end of the conveyor. Then, there would be no need for constant supervision. The end products would be uniformly grilled or hearth baked.

Accordingly, an object of the invention is to provide new and improved conveyor ovens of the described type. Here, an object is to provide ovens which grill or hearth bake while responding to and overcoming the above stated and similar problems.

Another object of the invention is to provide new and improved toaster size, commercial conveyor ovens having a griddle-like surface. Yet another object is to provide such a multi-purpose conveyor toaster/oven having a relatively small size.

SUMMARY OF INVENTION

According to an aspect of the invention, a conveyor toaster/oven includes a housing having a heated tunnel with an entrance at one end for enabling an inflow of food products to be toasted, heated or hearth baked during a single traverse through the tunnel to an exit at the opposite end of the tunnel. A conveyor transports food products from the entrance through the tunnel to the exit.

A heater element is positioned above and below the conveyor and along the length of the tunnel, in order to provide the toasting or baking heat. Temperature sensing elements are arranged in physical contact with the heater elements in order to sense the actual temperatures of the heating elements themselves, as distinguished from sensing the ambient heat within the housing. Temperature controllers are connected to the temperature sensing elements, respectively, for controlling an energization of the heater elements in response to their actual temperatures. The controllers may be either complex (such as a microprocessor) or a simple device having a built-in arithmetic control of temperatures.

In keeping with another aspect of the invention, the conveyor toaster/oven may have a conveyor made from either an open wire-link belt or a tightly woven herringbone belt of closely spaced wires which will hearth bake food products. Either belt is flexible enough to move over a closed loop and still present a fairly compact and uniform surface. The herringbone belt is formed by a number of somewhat flattened wire spirals which nest together to form an almost solid surface, while providing a very flexible belt which easily travels over a pair of spaced parallel rollers. An adjustment of conveyor speed enables the toasting/hearth baking of a few or many food product items.

The invention may be understood from the following description of a preferred embodiment, taken in connection with the attached drawings, in which:

FIG. 1A is a front elevation of a second embodiment of the inventive toaster/oven controlled by a rotary knob or other suitable switches;

Figure 2:
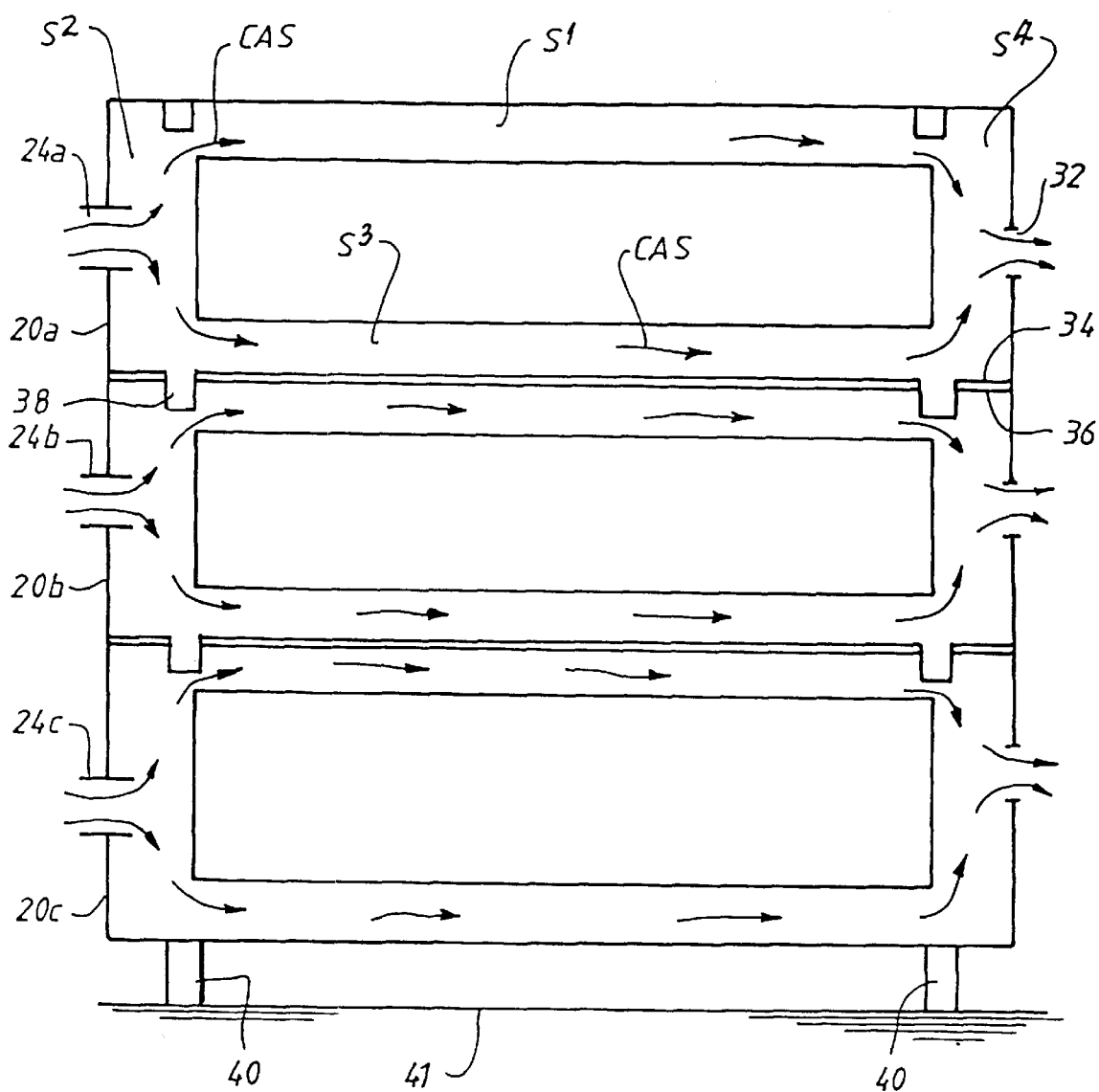
Figure 3:
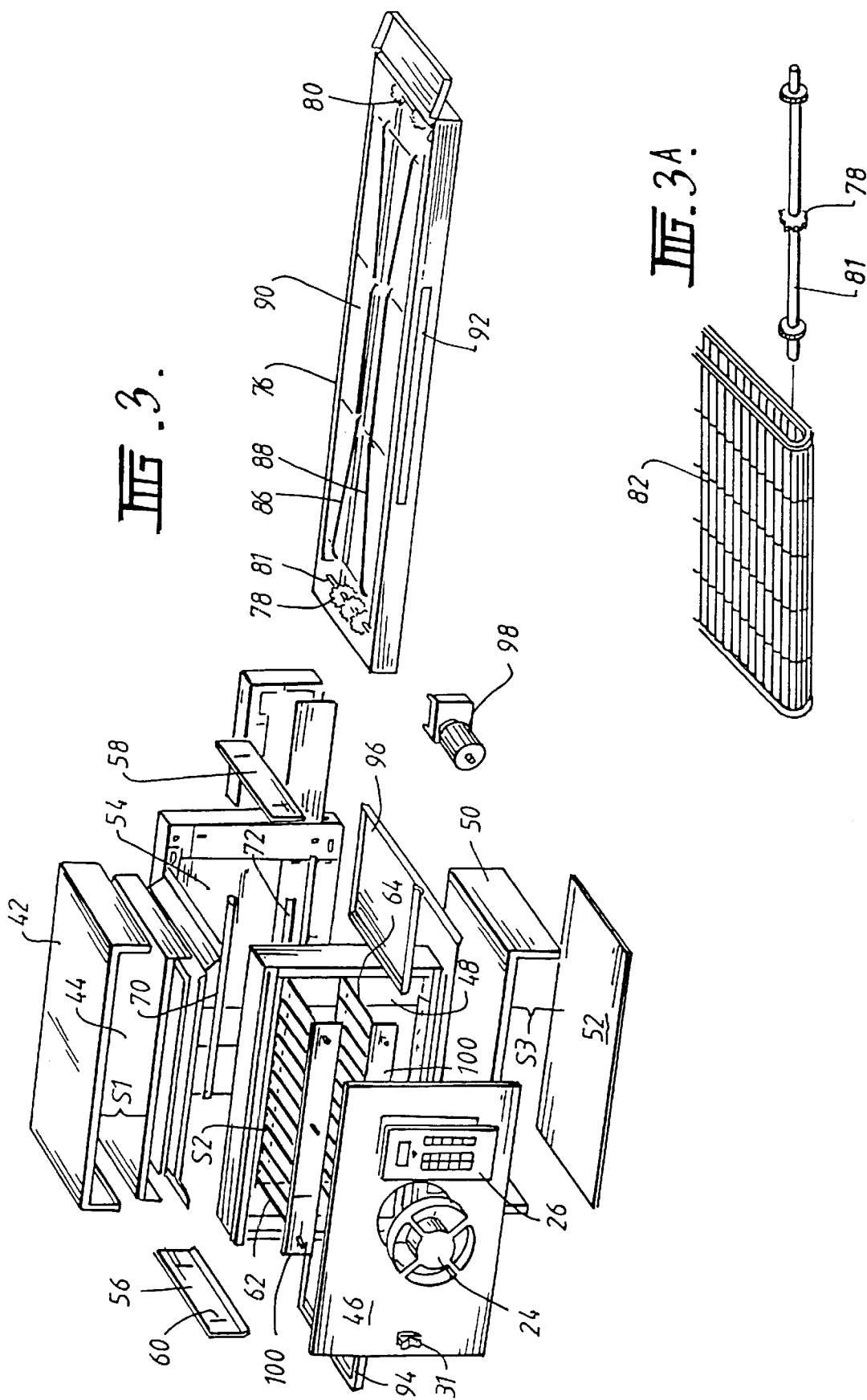
Figure 4:
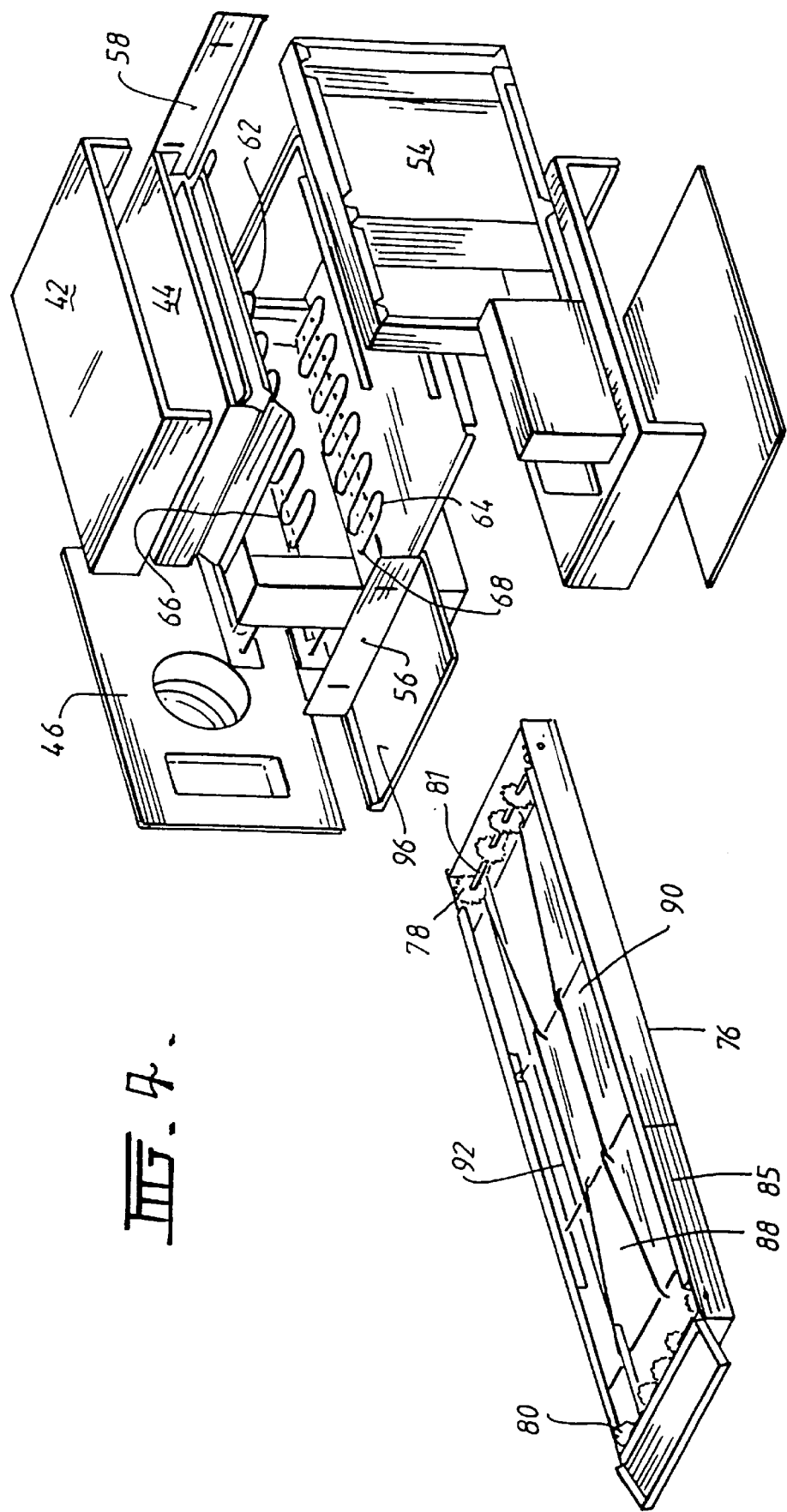
Figure 5:
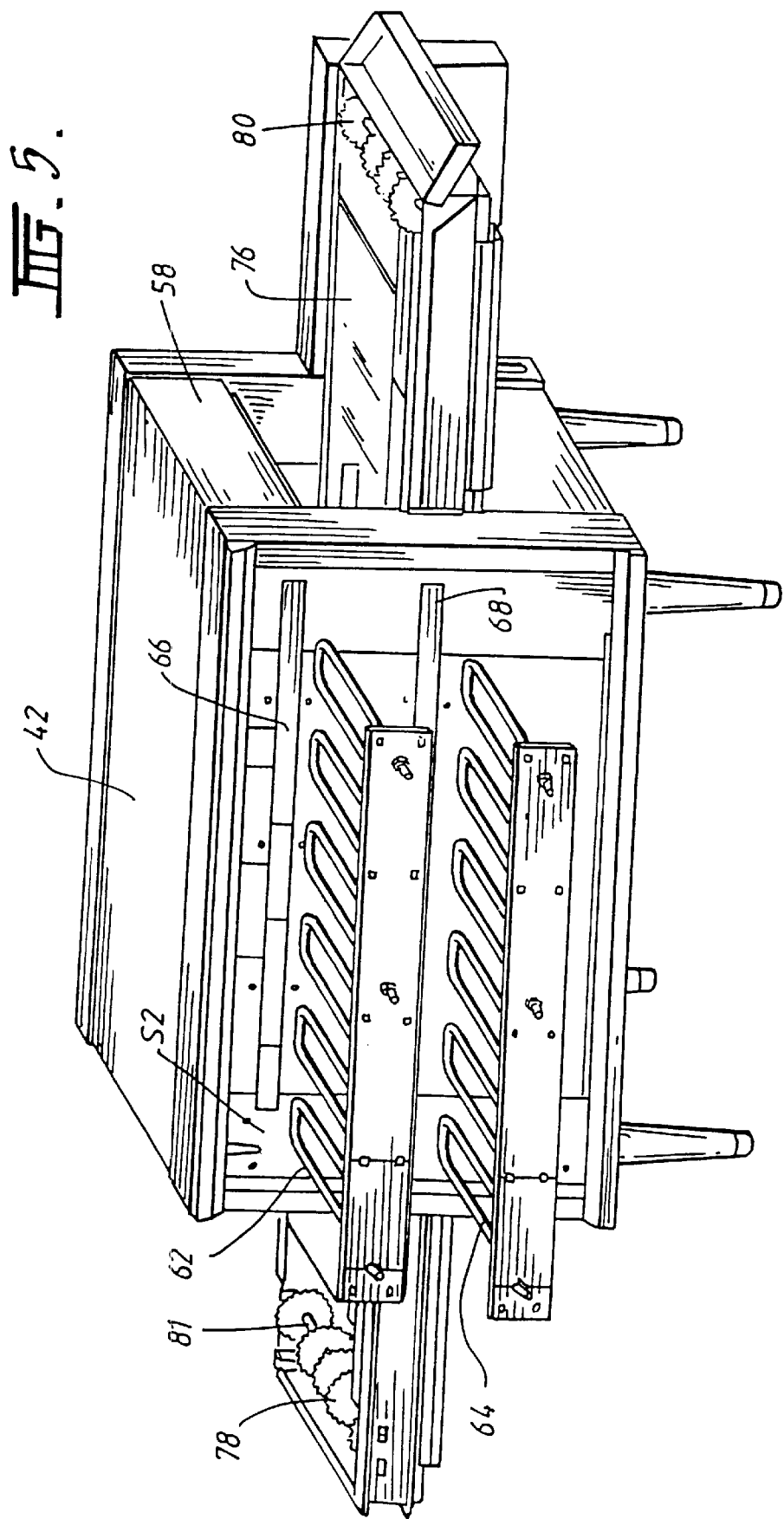
Figure 6:
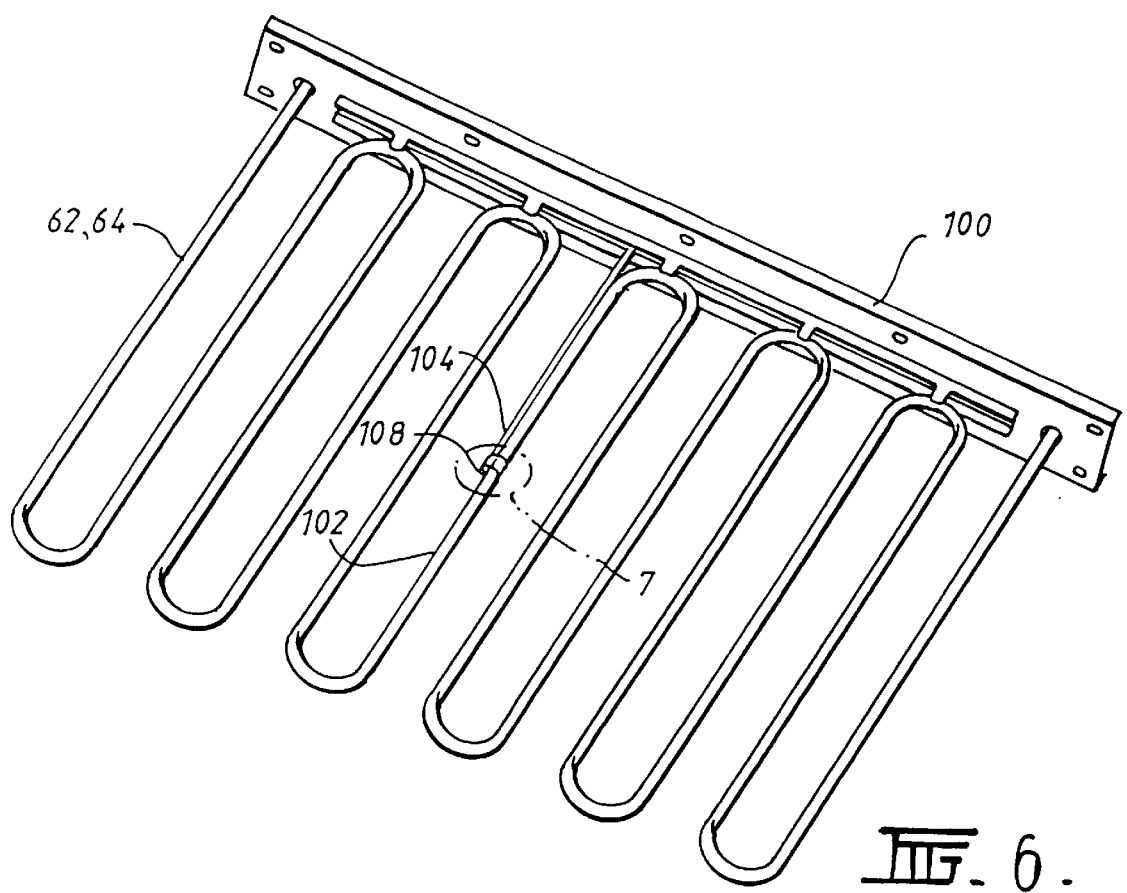
Figure 7:
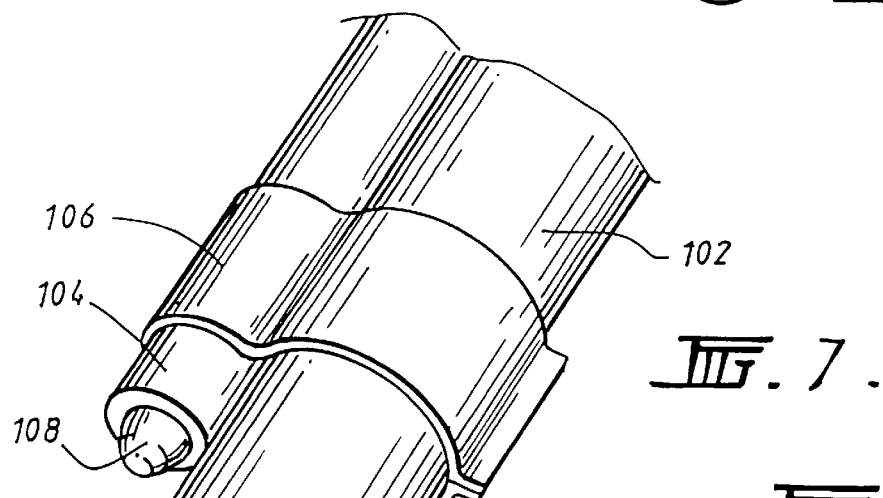
Figure 7A:
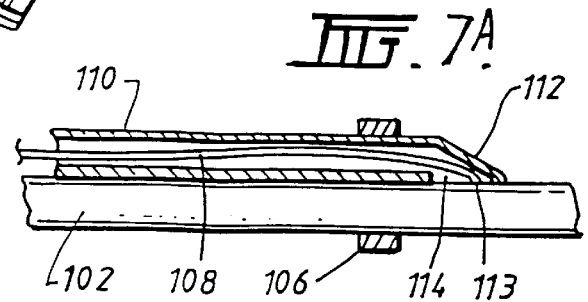
Figure 8:
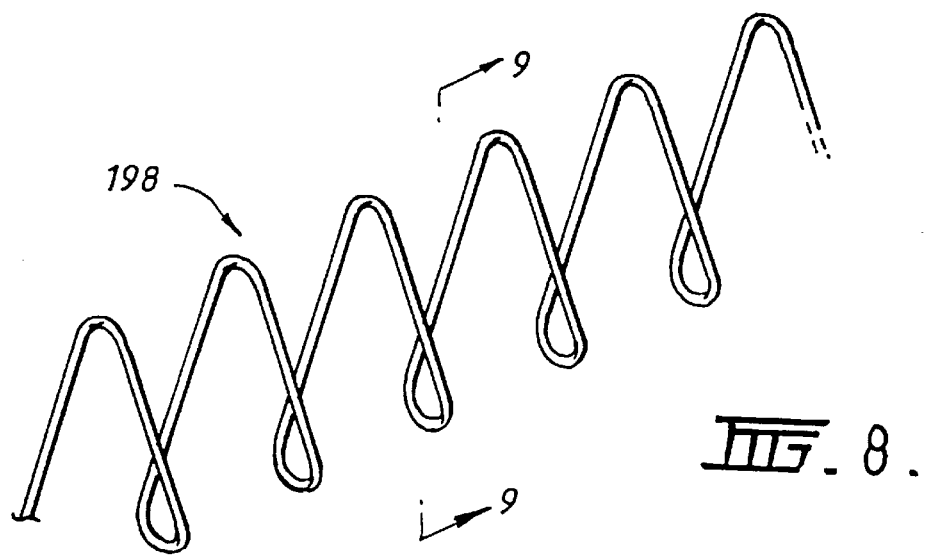
Figure 9:
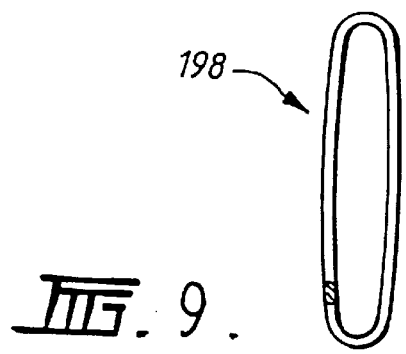
Figure 10:
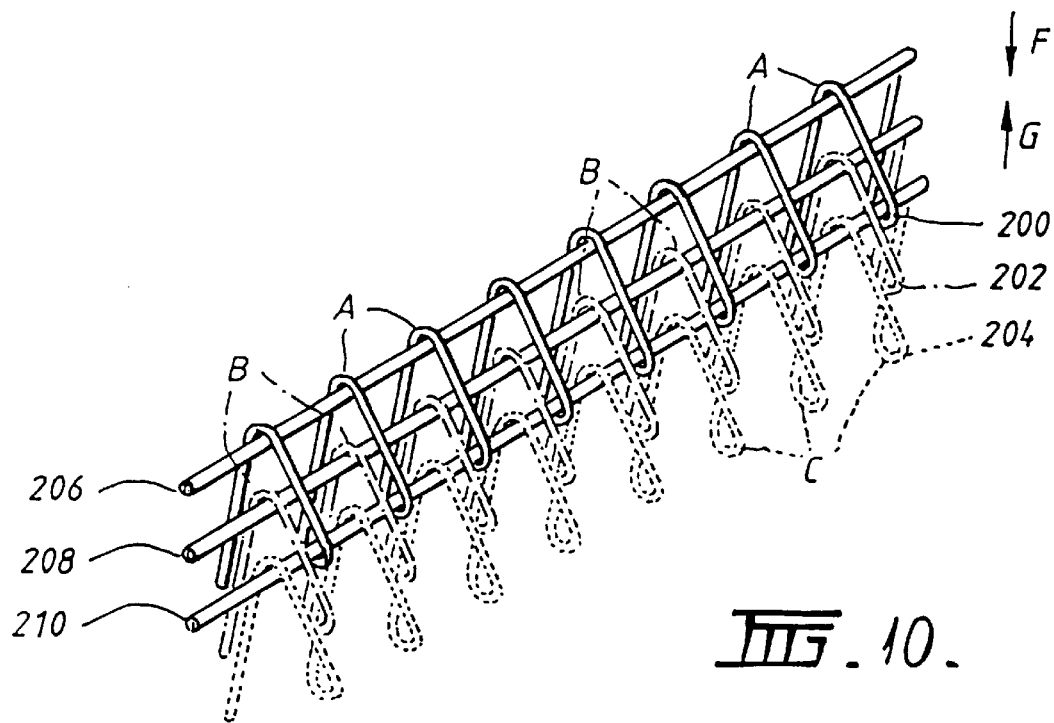
Figure 13:
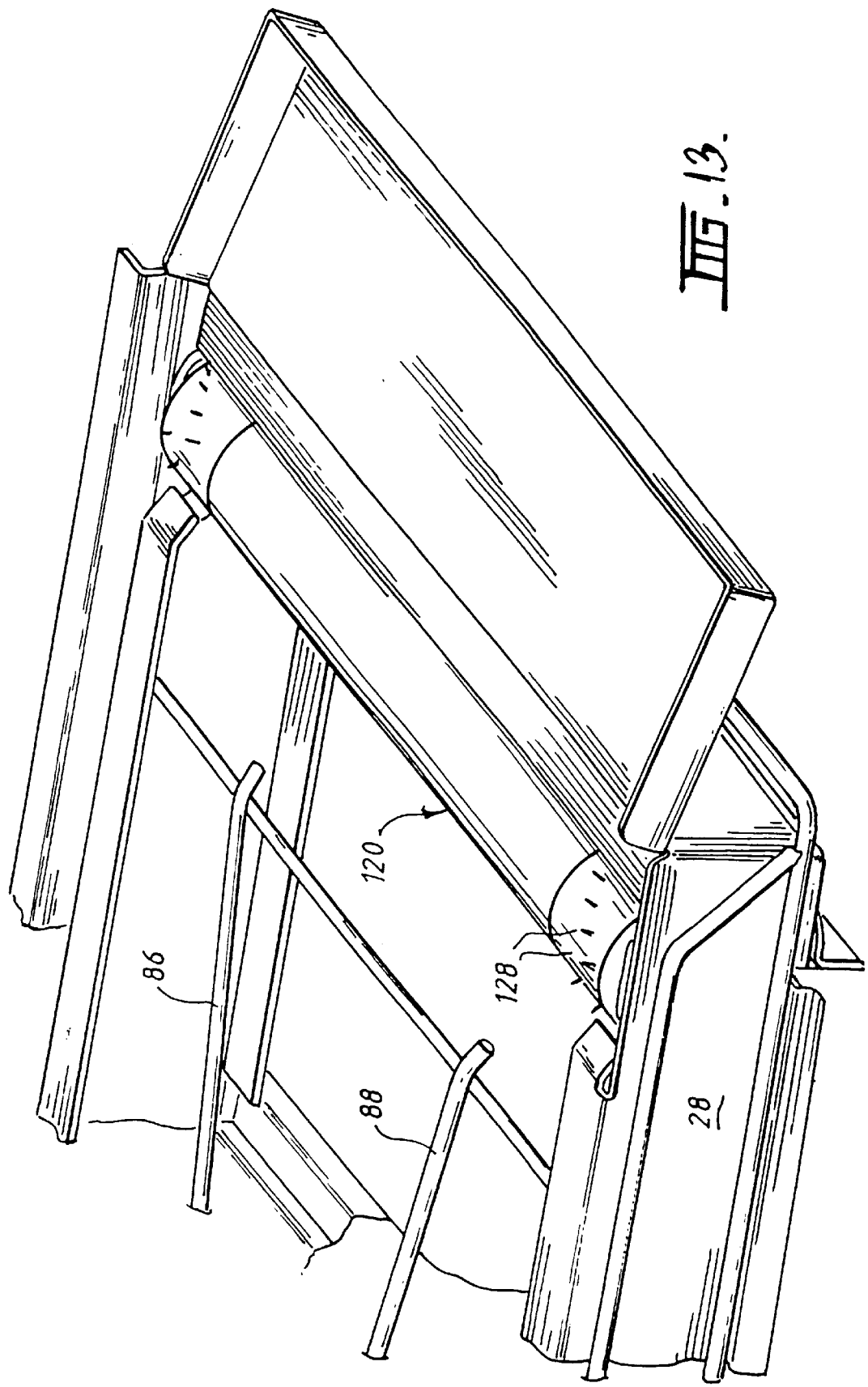

FIG. 2 graphically describes how a number of the inventive toaster/ovens may be stacked;

FIG. 3 is a first exploded view of the toaster/oven, taken from the front of the oven;

FIG. 3A is a perspective view which shows a fragment of an open wire link conveyor belt;

FIG. 4 is a second exploded view of the toaster/oven taken from the back of the oven;

FIG. 5 is a perspective view of part of the front of the oven with the heating elements exploded out of the oven;

FIG. 6 is a perspective view of a single heating element with a temperature sensor attached thereto;

FIG. 7 is a first embodiment showing an enlarged fragment of the sensor that is enclosed within the dashed line circle 7 on FIG. 6;

FIG. 7A is a cross section showing a fragment of a second embodiment of the sensor which brings the temperature sensor into actual physical contact with the heating element;

FIG. 8 is a perspective view which shows a single flight of a woven hearth bake conveyor belt;

FIG. 9 is an end view taken along line 9—9 of FIG. 8;

FIG. 10 shows three flights, similar to FIG. 10, being assembled into a tightly woven herringbone hearth bake belt;

FIG. 11 is a plan view which shows part of a tightly woven herringbone hearth bake conveyor belt;

FIG. 12 is a perspective and exploded view which shows a roller for driving a tightly woven herringbone hearth belt to provide a hearth bake capability; and FIG. 13 shows the roller of FIG. 12 installed in the inventive oven.

Figure 1:
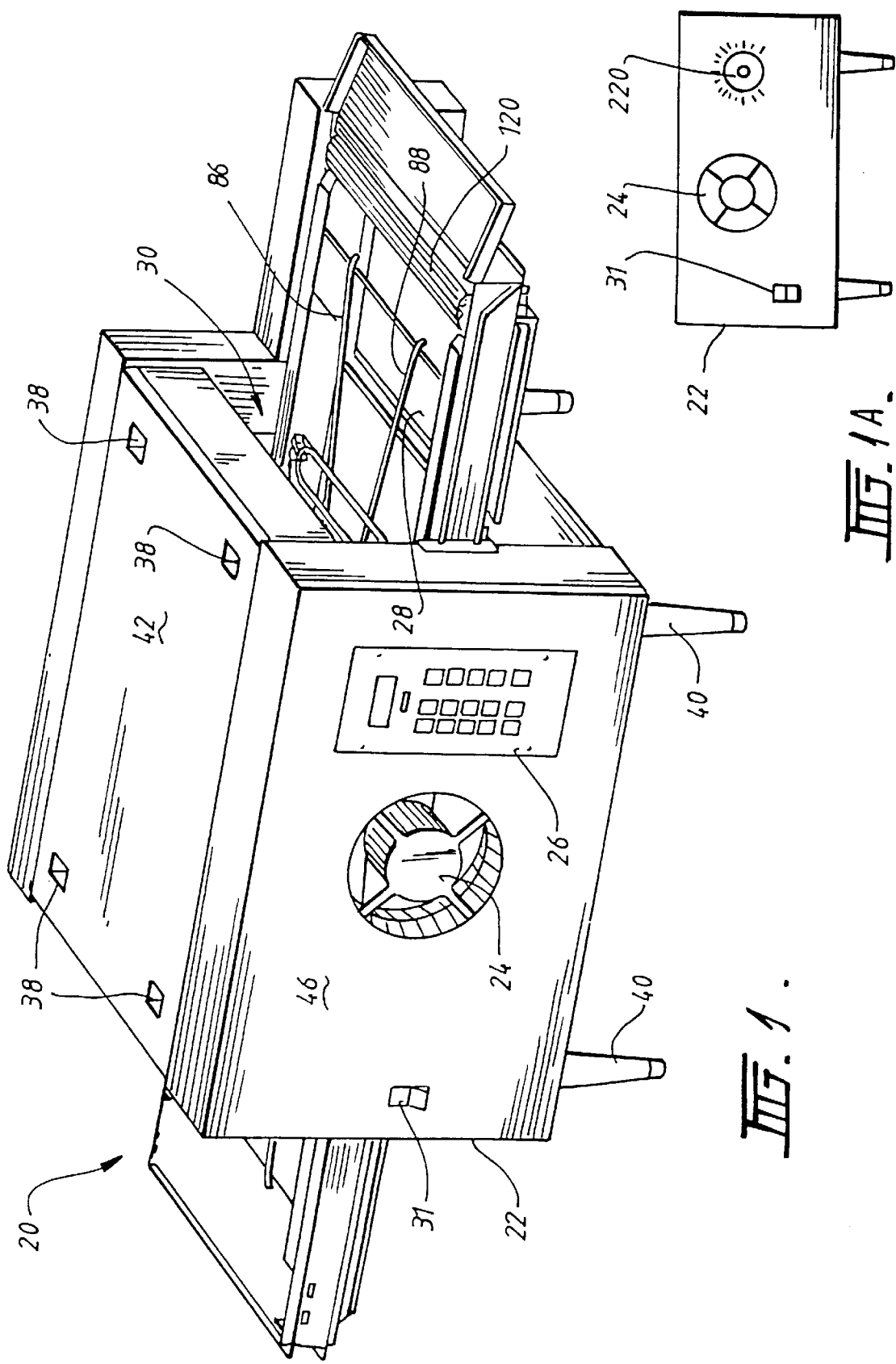
FIG. 1 is a perspective view of a first embodiment of the inventive toaster/oven controlled from a key pad coupled to a suitable microprocessor or logic circuit.

FIG. 1 shows the inventive conveyor toaster/oven 20 which includes a housing 22 including a fan 24 and a control panel 26 having a key pad and with a conveyor 28 extending through a tunnel 30 in the housing 22. Switch 31 is a simple "on/off" switch.

The control panel 26 is substantially the same as the control panel shown in U.S. Pat. Nos. 5,197,375 and 5,253,564 which control a circuit shown in those same patents. However, the control panel and circuit of these patents is modified by providing a mathematical function which converts the oven temperature set responsive to temperatures sensed directly from the heater element. This form of control enables the user to pre-program a menu, such as five, of different schedules, which may be modified at will by the user. The programming may assign an individual key on the key pad to identify each of the five schedules so that each schedule may be selected by operating a single key. These schedules may individually control upper and lower heating elements.

The toaster/oven 20 is designed so that a plurality of them may be stacked one on the other, as shown in FIG. 2. As will become more apparent, each toaster/oven 20a–20c has double wall sides, top, and bottom panels formed by spaced parallel panels in order to provide a common plenum or wind space (such as S1–S4) between them. Hence, each oven has a cooling stream CAS of air flowing through the plenum or wind space under the force of a fan 24. The cooling air streams recombing in plenum space S4 and exit through a port 32 in back of the oven.

This is different from most ovens which require an air port at the bottom of the oven that would require an air space between the bottom panel 34 of one toaster/oven and the top panel 36 of the toaster/oven directly under it. Since the cooling air does not traverse through a bottom port in the bottom panel 34, one oven may rest directly on the top panel 36 of the underlaying oven, with substantially no space between them. Still, the panels which may be touched by workers remain cool enough so that they may comfortably rest their hands on them. In a preferred embodiment, the skin temperature of the toaster/oven is not over 115° F.

To facilitate stacking the toaster/ovens, each oven has four short legs on the bottom and four shallow depressions on the top. The legs and depressions have complementary contours 38 so that each short leg fits into and substantially fills each depression in order to hold the stack of ovens in a nearly perfect vertical alignment.

The bottom oven 20c has relatively long legs 40 for holding the stack of ovens elevated above any suitable supporting structure, such as a table 41.

The spaced parallel panels forming housing side walls are best seen in FIGS. 3 and 4. Space S1 is formed between top panels 42 and 44. Space S2 is formed between front panels 46, 48. Space S3 is formed between bottom panels 50, 52. The space S4 is formed between panel 54 and another panel, not shown in FIG. 4 and omitted for clarity in FIG. 5. The housing panels are modular so that the oven may be made larger or smaller by simply substituting larger or smaller panels for each other.

A pair of "eyebrow" panels 56, 58 are mounted on top panel 42 at the entrance and exit, respectively, of tunnel 30 through the housing. Each of these panels 56, 58 has a pair of vertically elongated slots so that the vertical position of the panels may be adjusted to establish the vertical dimension of the throat at the entrance or exit of the oven tunnel 30.

Heat is supplied to the toaster/oven from upper and lower heating elements 62, 64 (FIGS. 3, 4, and 5) which slide through horizontal slots 66, 68 in the front side panel and through slots 70, 72 in the rear side panel. Preferable, these heating elements are rod-like members, such as those sold under the trademark "CAL-ROD". The heat schedule supplied to these heating elements is controlled from either a microprocessor controlled from the control panel 26 when a sophisticated oven is supplied or from an electronic logic circuit on a less sophisticated oven. A mathematical formula built into these controls calculates the appropriate temperature and conveyor speed responsive temperatures sensed at the surface of the heater element.

The conveyor 28 assembly simply slides into the tunnel 30 through the toaster/oven. In one embodiment, sprocket wheels 78, 80, mounted on an axle 81 (FIG. 3A), provide a means for driving an open wire link conveyor belt 82 (FIG. 3A). In between the sprocket wheels 78, 80, at the opposite ends of the conveyor (FIG. 3), the open wire link belt 82 is supported by two horizontal rods 86, 88.

A central crumb tray 90 is slid through a slot 92 in the conveyor. Two other crumb trays 94, 96 are mounted on opposite ends of the housing to complete a series of crumb trays extending along the length of the conveyor.

The conveyor belt 82 is driven by an electric motor 98 which may be connected to axle 81 on one end of conveyor 76 via a bicycle chain, for example.

FIG. 6 shows a "CAL-ROD" heating element 62, 64 which may be positioned above or below the conveyor. Bolted to the interior side housing panel 48 (FIG. 3) is a face plate 100, for supporting the heating element 62, 64.

A temperature sensor 108 is also supported by face plate 100. The sensor 108 extends parallel to and in intimate contact with a section 102 of the heating element. Hence, the sensor is detects the actual temperature of the heating element, as distinguished from the ambient temperature inside the oven cavity.

FIGS. 7 and 7A show the details of the sensor enclosed within dashed line circle 7 in FIG. 6. A length 102 of the rod-like heater element 62, 64 (such as a CAL-ROD element) has a heat conducting (soft iron) tube 104 held in intimate contact therewith, by means of a suitable clamp 106. The sensor includes a thermalcouple 108 which may slide through the iron tube 104. This way, the sensor may be installed, removed, and replaced quickly and easily by simply pulling it from or inserting it through iron tube 104.

The construction of FIG. 7 is preferable for most uses. It provides a superior control over heating since the sensor detects the temperature of the heating element, per se, as transmitted through soft iron tube 104. This means that the system knows instantly if the temperature of the element either increases or decreases so that temperature corrections can be made at once and before a significant temperature change occurs within the housing.

This quick response eliminates some problems which may occur if the ambient temperature of the toaster/oven is measured since then a change of temperature is not detected until the internal oven air cools. The sensor calls for more heat which is not forth coming until the heating element heats enough to warm the ambient air. The reverse occurs on over heating. Hence, measuring the temperature of ambient air leads to hunting for an average temperature within the oven.

In some instances, an even greater degree of control may be desirable. In this case, a soft iron tube 110 (FIG. 4A) has a downwardly sloping wall at the sensor end 112. Therefore, when it is slid into the tube 110, the thermocouple 108 encounters a sloping end wall 112 which deflects the thermocouple through a window 114 in the end wall 112 and into a direct physical contact with the heating element 102. The wires of sensor 108 may bow slightly when forced through the pipe 110, in order to place the thermocouple in a pressure contact with the heating element 102.

The toaster/oven described thus for is designed for use with the open wire link conveyor 82 (FIG. 3A). The transverse wires forming conveyor 82 enables heat from the lower heating element 64 to pass directly to the lower surface of the food product on the conveyor, which ideal for many food products.

There is another form of food preparation called "hearth bake" which means that the food product starts by being placed on a hot surface.

For hearth baking, a tightly woven herringbone belt (FIGS. 8–11) is used. This type of conveyor belt is sometimes called a "Chevron Weave" and is available from Wiremation Conveyor Belting, a division of Lumsden Corporation, P.O. Box 4647, Lancaster, Pa., 17604.

Briefly, the tightly woven herringbone hearth belt may be made of stainless steel or other similar and suitable wires. Each wire is formed into a somewhat flattened spiral 198 shown in perspective in FIG. 8 and in end view in FIG. 9.

As here shown, an exemplary three spirals 200, 202, 204 (FIG. 10) are formed into relatively long flights which extend across the entire width of the belt. One spiral flight 200 is shown by a solid line; one spiral flight 202 by a dot-dashed line; and one spiral flight 204 by a dotted line. Spiral 200 moves down (direction F) and one spiral 204 moves up (direction G) so that the successive coils or loops embrace and touch each other to form a substantially flat, perhaps griddle-like surface. After the spiral flights nest, rods 206, 208, 210 are threaded through each coil or turn of the individual spirals in order to link them together.

The tightly woven belt is originally made as an elongated mat. To form that mat into an endless loop that can be used as a conveyor belt, a section of the mat is measured and then three rods are pulled at a desired location, thus making an elongated mat having a selected length. Then, the opposite ends of the mat are brought together and the coils or turns on the two ends of the mat are interdigitated.

Three rods such 206, 208, 210 are inserted through the interdigitated end spirals of the mat in order to create a closed and seamless loop. Each rod passes through all of the interdigitated coils or turns which were formerly on the end spirals of the mat. The resulting surface of the tightly woven herringbone hearth belt is substantially flat and has the successive coils or turns of the neighboring spirals touching each other.

In FIG. 11, the successive turns of a first spiral are marked A1, A2, ... etc. The turns of a second spiral are marked B1, B2, ... etc. The turns of a third spiral are marked C1, C2, ... etc. Collectively, the spirals produce a flat surface having a herringbone pattern of contiguous wires. When heated, the described surface has a griddle-like quality so that it is suitable for hearth baking food products.

The herringbone belt is formed into an endless loop which is trained over a pair of rollers 120 (FIGS. 12, 13) that replace the pair of sprocket wheels 78, 80 (FIGS. 3–5).

The roller 120 includes two end caps 124, 126 which fit snugly and with a friction fit into the opposite ends of pipe 122. The end caps have a plurality of pins (such as 128, 130) projecting from the peripheral surface thereof. The arrangement is such that a minimum of six pins on each cap engage the tightly woven herringbone hearth belt at all times. Also the pins are in a pattern which sweep from end to end across the length of the peripheral cap surface so that the pins do not always touch the same spot on the belt. FIG. 13 shows the roller 120 mounted in an end of conveyor 28.

If the oven is to be used exclusively as a toaster, for example, the open wire link conveyor belt (FIG. 3A) is used with sprocket wheels. If it is to be used exclusively for hearth baking, a tightly woven type of conveyor belt (FIG. 11) may be used with rollers (FIG. 13). Usually, the manufacturer selects between these two types of belts. However, the conveyor is easily converted in the field, if the need to do so should arise.

A premier version of the invention has been described thus far wherein the keypad on control panel 26 may be manipulated to store in a microprocessor menu comprising a plurality of complex schedules of temperatures and conveyor speeds in order to prepare a food product in a gourmet fashion. The user may store, modify, or replace the schedules, at will.

Sometimes, the effort is simply to prepare food, as in a fast food restaurant. In this case, the control panel 26 (FIG. 1) may be omitted and a manually operated rotary knob 220 (FIG. 1A) substituted therefor. Depending upon the user's needs, this knob may be a simple temperature selector, as in most home ovens. This knob may also be calibrated by a number of designators each of which represents an individual one of a menu of cooking schedules, such as "meat, poultry, ... and the like". It is also within the scope of this embodiment to provide a simple calculator to calculate temperature and speed by solving a fixed mathematical formula based upon from a data sensor on the heating element. Preferably, the temperature is controlled independently for the upper and lower heating elements 62, 64.

Those who are skilled in the art will readily perceive how to modify the invention. Therefore, the appended claims are to be construed to cover all equivalent structures which fall within the true scope and spirit of the invention.

The claimed invention is:

1. A small toaster/oven sized appliance comprising a housing having a tunnel there through; an elongated conveyor extending through said tunnel, a pair of rotatable rollers, each of said rollers being mounted on an individually associated end of said conveyor; an endless tightly woven flexible conveyor belt loop trained over said pair of rollers in order to convey a food product through said toaster/oven, means for hooking and unhooking opposite ends of said belt to form or open said endless conveyor belt loop around said rollers whereby said conveyor belt may be installed, removed, and replaced; said roller having end caps with pins projecting therefrom, said end caps having said pins being arranged on said end cap in a pattern so that said pins do not always engage the same place on said conveyor belt; heater means positioned above and below said conveyor belt for hearth baking a food product resting on said conveyor belt while said food product is being conveyed through said toaster/oven; and control means for selecting a menu of temperature and conveyor speed selections which provide a dwell time within the oven which correctly hearth bakes the food product, said control means being controlled by the surface temperature on a heating element.

2. The toaster/oven of claim 1 wherein said conveyor is constructed to enable a replacement of said rollers with sprocket wheels and to enable a replacement of said tightly woven belt with an open wire link belt, whereby said toaster/oven may be adapted to either hearth bake or to toast.

3. The toaster/oven of claim 1 wherein said tightly woven belt is made of a plurality of somewhat flattened spiral wire flights, said spiral having a generally oval cross section, coils of said spiral wires being spaced and dimensioned so that said coils of individual ones of said plurality of spiral flights interdigitate and embrace each other to form a generally flat surface on said tightly woven belt.

4. The toaster/oven of claim 3 wherein said plurality of spiral flights which interdigit are three successive spirals flights which are interdigitated and embraced at any place along the conveyor, and an individually associated rod extending through each of said spirals for linking it to other of said spirals, said rods extending entirely across a width of said conveyor belt, whereby each group of said three spirals along a length of said conveyor requires three rods.

5. A conveyor toaster/oven sized appliance comprising a housing having a tunnel therein; conveyor means comprising an endless flexible belt loop extending through said tunnel and projecting outwardly and away from said housing at each end of said tunnel; means for driving said conveyor in order to convey food products from one to the other of said projecting ends of said conveyor; radiant heater means above and below said belt to deliver heat directly to said food product as said conveyor moves said food product through said tunnel; means for sensing a temperature at a surface of said heater means; and control means responsive to said temperature sensed at said heater means for adjusting a speed at which said conveyor belt moves said food product through said oven in order to select a dwell time for said food products while in said oven and for selecting a level of heat in said oven during said dwell time in order to establish a speed and temperature combination which prepares said food product for consumption during said dwell time.

6. The toaster/oven of claim 5 wherein said control means comprises a keypad controlled means for entering and storing data comprising a menu of combined speed and temperature selections, means responsive to operation of said key pad for presetting said selections in memory, and means for assigning each of said selections in said menu to an individual key in said key pad whereby each selection may be selected by an operation of a single key.

7. The toaster/oven of claim 5 wherein said control means comprises a menu of different selections built into said toaster/oven, each of said selections comprising a combination of a temperature and a conveyor speed, and means responsive to a manual operation for selecting one of said different selections.

8. The toaster/oven of claim 5 wherein said control means contains a mathematical formula for estimating oven temperatures responsive to the temperatures sensed at the surfaces of said heater means, said control means converting a stored menu into oven temperature by calculating temperature and conveyor speed jointly responsive to said mathematical formula and temperature sensed at a surface of said heater means, whereby oven temperature is calculated instead of being measured directly.

9. The toaster/oven of claim 5 wherein said endless belt is a tightly woven metal belt made of a plurality of somewhat flattened spiral wires, successive coils of said spiral being spaced and dimensioned so that said coils of individual ones of said plurality of spirals interdigitate and embrace each other to form a generally flat surface on said conveyor belt.

10. The toaster/oven of claim 5 wherein there are a plurality of different types of said flexible belt loops, and means for substituting one of said types of said belt loops for another of said types of said belt loops.

11. A conveyor toaster/oven comprising a housing containing an oven cavity in the form of a tunnel extending from an entrance to an exit of said housing, a conveyor extending through said tunnel and outwardly beyond both said entrance and said exit, a pair of spaced parallel shafts extending traversely adjacent a front and rear of said conveyor, respectfully; an endless flexible belt loop trained over said pair of shafts; means for driving said endless belt in order to convey food products from said entrance through said tunnel and out said exit; radiant heating elements above and below said conveyor for supply radiant heat to said food products while they are being conveyed through said tunnel; sensor means supported on and in contact with a surface of said heating element for measuring the surface temperature of said heating element; and calculator means responsive to said sensor means for calculating adjusting oven temperature and the temperature of the heating element in order to accommodate characteristics of said food products.

12. The toaster/oven of claim 11 wherein said heating element is a rod-like element having a heat conductive tube in intimate contact with at least part of said heating element, and said sensor means includes a sensor which slides through said heat conductive tube, whereby said sensor may be installed or removed.

13. The toaster/oven of claim 12 wherein said sensor has a thermocouple at an end of a wire-like element and said heat conductive tube ends in a geometrical shape which deflects said thermocouple into direct physical contact with said surface of said rod-like heating element in response to said wire-like element being pushed through said tube.

14. A conveyor toaster/oven having dimensions for mounting on a table top, a tunnel extending through said housing, an endless loop conveyor extending through said tunnel, said conveyor being made of a tightly woven conveyor health belt comprising a plurality of spiral wires, said spiral wires extending across an entire width of said tightly woven conveyor belt, successive coils of said spiral wires being spaced and dimensioned so that said coils of individual ones of spirals interdigitate and embrace each other to form a generally flat griddle-like surface, said interdigitated coils embracing each other at all places along the endless conveyor loop, and an individually associated rod extending across an entire width of said conveyor belt and through each of said spirals, said conveyor extending entirely through and projecting beyond each end of an oven housing so that raw food may be placed on one projecting end of said conveyor and cooked food removed from the other projecting end of said conveyor, means for radiantly and directly heating said conveyor, means for driving said conveyor, control means responsive to temperatures sensed at a surface of said radiant heating means for controlling oven temperature and conveyor speed, said control means including a key pad and microprocessor for storing a menu of different temperatures and conveyor speeds which can be preset and modified, and microprocessor means responsive to a built in formula for identifying and selecting any one of said different temperatures and conveyor speeds by making a calculation based on said formula and in response to a detection of said temperatures sensed at the surface of said heating means.

15. A plurality of stackable table top toaster/ovens, each of said ovens having a housing with spaced parallel sidewalls joined by top and bottom walls; each of said side, top, and bottom walls being formed by a spaced parallel pair of panels forming a common plenum through which air can flow; said top and bottom walls being free of openings through which said air can escape said common plenum, fan means in one side wall and an exit port formed in an opposite side wall whereby said fan blows air from outside said one side wall through said plenum in said top and bottom walls and out said exit port in said opposite wall whereby said top and bottom walls are cooled by said air blown thorough said plenum, and said top and bottom walls are configured to rest directly upon each other whereby the bottom of one stackable toaster/oven may be placed directly upon the top of an underlying toaster/oven with substantially no free space between them, said configuration of said top and bottom walls comprises indentations in one of said top and bottom walls and mating projections on the other of said top and bottom walls whereby said indentions and projections have said ovens in vertical alignment.

16. The toaster/oven of claim 15 further comprising heater means, conveyor means extending through said toaster/oven, control means comprising a key pad for entering and storing data comprising a menu including a plurality of combination of different conveyor speeds and temperature selections, memory means, means responsive to operation of said key pad for presetting said conveyor speeds and temperature selections in said memory means for assigning each of said conveyor speeds and temperature selections on said menu to an individual key in said key pad whereby each assigned conveyor speed and temperature selections may be selected by an operation of a single key, said control means converting said stored menu in accordance with a mathematical formula which calculates temperature and conveyor speed responsive to temperature sensed at a surface of said heater means.

17. A toaster/oven of claim 15 further comprising an elongated conveyor in a tunnel extending from end to end of said housing; a pair of rotatable shafts mounted on individually associated ends of said conveyor; an endless conveyor belt loop trained over said pair of shafts in order to convey a food product through said toaster/oven; means for hooking and unhooking opposite ends of said belt to form or open said endless conveyor belt loop around said rotatable shaft, whereby said belt may be installed, removed, and replaced; heater means positioned above and below said belt for heating a food product resting on said conveyor belt while said food product is being conveyed through said toaster/oven, said heating element being a rod-like element having a heat conductive tube in intimate contact therewith; sensor means includes an element which slides through and heat conductive tube in order to measure the heat at the surface of said rod-like element; control means for adjusting a speed at which said conveyor belt conveys said food product through said oven in order to select a dwell time for said food products while in said oven and for adjusting heat in said oven during said dwell time, said control means establishing a speed and temperature combination which prepares said food product for consumption during said dwell time, said control means comprising a key pad for storing a menu of different speed and temperature selections, said control means modifying said stored menu in response to a mathematical formula which automatically calculates temperature and speed and in response to a temperature sensed at the surface of said heater means.

18. The toaster/oven of claim 17 further comprising an endless loop conveyor made of a tightly woven belt comprising a plurality of spiral wires, said spiral wires extending across an entire width of said conveyor to form a tightly woven conveyor belt, successive coils of said spiral wires being spaced and dimensioned so that said coils of individual ones of said spirals interdigitate and embrace each other to form a generally flat griddle-like surface, said interdigitated coils embracing each other at all places along the endless conveyor loop, and an individually associated rod extending across an entire width of said conveyor belt, and through each of said spirals, said conveyor extending entirely through and projecting beyond each end of an oven housing so that raw food may be placed on one projecting end of said conveyor and cooked food removed from the other projecting end of said housing.

19. The toaster/oven of claim 15 wherein said oven has a common plenum surrounding said tunnel, means for inserting air into said plenum from one side of said housing and for exhasting said air from an opposite side of said oven whereby air does not enter or exit said plenum at top and bottom surfaces of said oven, and means for enabling a plurality of said ovens to be stacked one on the other with substantially no free space between said top and bottom surfaces of said stacked ovens.

* * * * *